No. 825,956. PATENTED JULY 17, 1906.
A. BOWIE.
JOURNAL ROLLER BEARING.
APPLICATION FILED APR. 12, 1906.
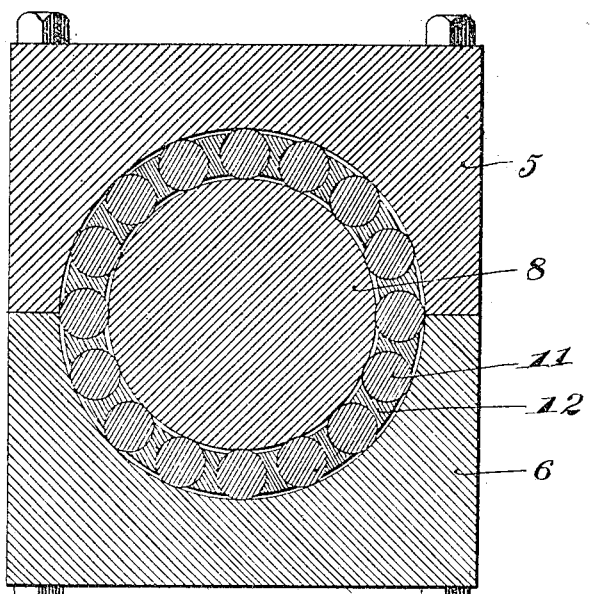
Fig. 1.
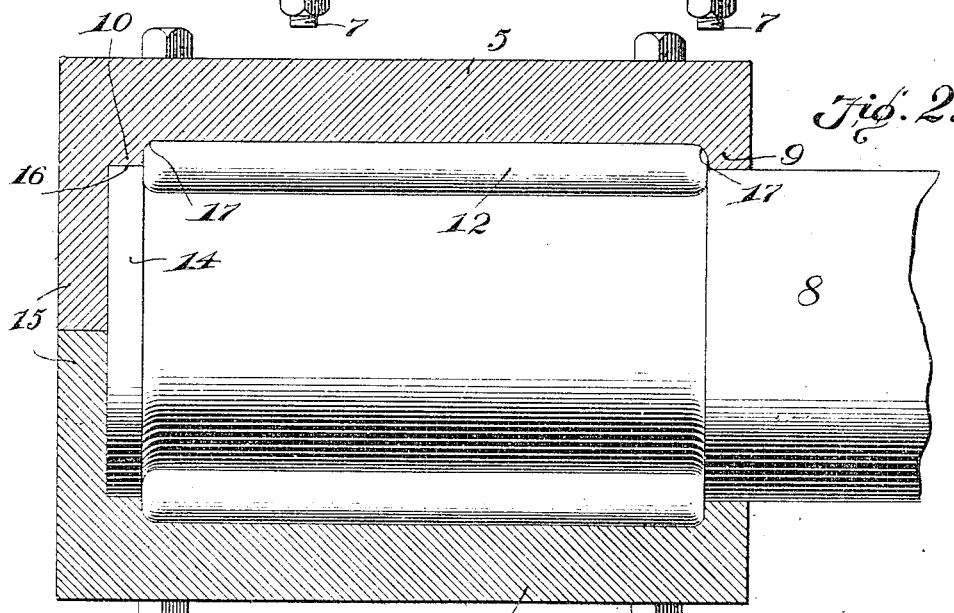
Fig. 2.
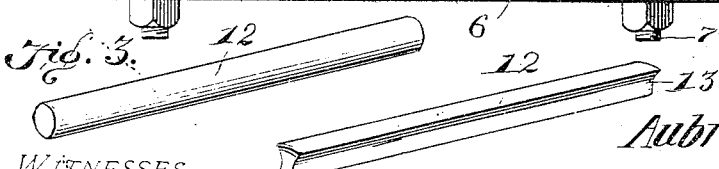
Fig. 3.
Fig. 4.
WITNESSES:
Aubrey Bowie,
INVENTOR
By
ATTORNEYS

UNITED STATES PATENT OFFICE.

AUBREY BOWIE, OF SANFORD, FLORIDA.

JOURNAL ROLLER-BEARING.

No. 825,956.　　　Specification of Letters Patent.　　　Patented July 17, 1906.

Application filed April 12, 1906. Serial No. 311,351.

*To all whom it may concern:*

Be it known that I, AUBREY BOWIE, a citizen of the United States, residing at Sanford, in the county of Orange and State of Florida, have invented a new and useful Journal Roller-Bearing, of which the following is a specification.

This invention relates to journal-bearings for railway cars, trucks, and other rolling-stock, and has for its object to provide an antifriction-bearing which is comparatively simple in construction, effective in operation, and one in which friction and wear on the several parts are reduced to a minimum.

A further object of the invention is to provide a sectional journal-box the ends of which are extended to form a closure for the free end of the journal, so as to effectually prevent the ingress of dust, dirt, and other foreign matter to the bearing.

A still further object of the invention is to generally improve this class of devices, so as to increase their utility, durability, and efficiency, as well as to reduce the cost of manufacture.

With these and other objects in view the invention consists in the construction and novel combination and arrangement of parts, hereinafter fully described, and illustrated in the accompanying drawings.

In the accompanying drawings, forming a part of this specification, Figure 1 is a transverse sectional view of a journal-bearing constructed in accordance with my invention. Fig. 2 is a longitudinal sectional view of the same. Fig. 3 is a perspective view of one of the antifriction-rollers detached, and Fig. 4 is a similar view of one of the spacing-blocks.

Similar numerals of reference indicate corresponding parts in all of the figures of the drawings.

The improved device consists of a journal-box, preferably formed in two sections 5 and 6, detachably secured together in any suitable manner, as by bolts or similar fastening devices 7, and in which is mounted for rotation the axle or journal 8.

The sections 5 and 6 are formed with angular stop-flanges 9 and 10, and bearing against said flanges and interposed between the interior walls of the journal-box sections and the journal 8 are a plurality of antifriction-rollers 11, disposed concentric with the journal, as shown. The antifriction-rollers 11 are spaced apart by elongated blocks 12, the opposite longitudinal edges of which are concaved, as indicated at 13, to conform to the curvature of the rollers 11. The outer end of the axle or journal 8 terminates in an annular flange 14, and formed integral with the journal-box sections 5 and 6 are depending portions 15, which form a closure for the outer end of the journal, so as to effectually prevent the entrance of dust, dirt, or other foreign material to the bearing. The flange 14 is seated in an annular recess 16, formed in the sections comprising the journal-box, the opposite ends of the journal being curved or rounded at 17 to form seats for the antifriction-rollers.

The extensions 15 not only prevent the dirt, grit, and other foreign material from entering the bearing and abrading or otherwise injuring the bearing-surfaces, but also serve to prevent the escape of oil or other lubricant introduced into the chamber formed by said section.

While the device is principally designed for use on cars and other rolling-stock, it is obvious that the same may be used with equally good results on carriages, wagons, shafting, or wherever a bearing of this character is found desirable.

Having thus described the invention, what is claimed is—

In a journal-bearing, a sectional journal-box provided with annular stop-flanges one of which forms an annular recess at the forward end of the journal-box, a journal mounted for rotation in said box and provided with a terminal flange seated in said annular recess, antifriction-rollers interposed between the journal and the adjacent interior walls of the sections, said sections being each formed with an integral extension the adjacent edges of which meet at the center of the journal and form a closure for the outer end of the latter, spacing-blocks having their opposite longitudinal edges concaved for engagement with the rollers, and bolts passing through openings formed in said sections for detachably securing the same in position on the journal.

In testimony that I claim the foregoing as my own I have hereto affixed my signature in the presence of two witnesses.

AUBREY BOWIE.

Witnesses:
　A. HOWLAND.
　A. E. BUCH.